United States Patent
Yang (10) Patent No.: US 7,805,398 B1
(45) Date of Patent: *Sep. 28, 2010

(54) REGISTERING RULES FOR ENTITY ATTRIBUTES FOR VALIDATION AND INFERENCE

(75) Inventor: Dongzhe Yang, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/572,041

(22) Filed: Oct. 1, 2009

Related U.S. Application Data (63) Continuation of application No. 11/841,871, filed on Aug. 20, 2007, now Pat. No. 7,610,256, which is a continuation of application No. 11/317,927, filed on Dec. 23, 2005, now Pat. No. 7,472,103.

(51) Int. Cl.
*G06F 9/44* (2006.01)
*G06N 7/02* (2006.01)
*G06N 7/06* (2006.01)

(52) U.S. Cl. .......................... 706/52; 706/47
(58) Field of Classification Search .................. 706/52
See application file for complete search history.

(56) References Cited

U.S. PATENT DOCUMENTS

| | | | |
|---|---|---|---|
| 5,541,849 A | 7/1996 | Rostoker et al. | |
| 6,421,822 B1 | 7/2002 | Pavela | |
| 6,714,201 B1 | 3/2004 | Grinstein et al. | |
| 6,825,840 B2 | 11/2004 | Gritz | |
| 6,853,377 B2 | 2/2005 | Pharr | |
| 7,009,608 B2 | 3/2006 | Pharr et al. | |
| 7,030,879 B1 | 4/2006 | Pharr | |
| 7,092,902 B2 | 8/2006 | Eldridge et al. | |
| 7,117,309 B2 | 10/2006 | Bearden | |
| 7,124,069 B2 | 10/2006 | Meuris et al. | |
| 7,130,863 B2 | 10/2006 | Diab | |
| 7,131,080 B2 | 10/2006 | Chen et al. | |
| 7,131,107 B2 | 10/2006 | Wall et al. | |
| 7,155,375 B1 | 12/2006 | Rimoldi et al. | |

(Continued)

OTHER PUBLICATIONS

Identification of wetland based on machine learning rules inferring, Ruan Renzong; Feng Xuezhi; Xiao Pengfeng; Geoscience and Remote Sensing Symposium, 2005. IGARSS '05. Proceedings. 2005 IEEE International vol. 4 Publication Year: 2005 , pp. 2478-2481.*

(Continued)

*Primary Examiner*—Michael Holmes
(74) *Attorney, Agent, or Firm*—Lahive & Cockfield, LLP; Kevin J. Canning (57) ABSTRACT

The present invention provides a method and system for registering rules for attributes of an entity with an entity validation and inference unit. The entity validation and inference unit can further validate input values for an entity and/or infer attributes of an entity using the associated registered rules. The entity validation and inference unit can also provide information regarding attributes, relations, and behaviors of an entity using the associated registered rules in response to a query. The present invention also provides a mechanism for a user to query an entity or the entity validation and inference unit regarding valid values for an entity. The mechanism also allows the user to query the registered rule associated with the entity.

40 Claims, 7 Drawing Sheets

U.S. PATENT DOCUMENTS

| | | | |
|---|---|---|---|
| 7,155,708 | B2 | 12/2006 | Hammes et al. |
| 7,177,851 | B2 | 2/2007 | Afeyan et al. |
| 7,194,557 | B1 | 3/2007 | Peacock |
| 7,203,628 | B1 | 4/2007 | St. Ville |
| 7,203,924 | B2 | 4/2007 | Rehof et al. |
| 7,219,045 | B1 | 5/2007 | Wu et al. |
| 7,236,009 | B1 | 6/2007 | Rohe et al. |
| 7,236,966 | B1 | 6/2007 | Jackson et al. |
| 7,243,054 | B2 | 7/2007 | Rappaport et al. |
| 7,243,055 | B2 | 7/2007 | Chen et al. |
| 7,266,565 | B2 | 9/2007 | Diab |
| 7,280,948 | B2 | 10/2007 | Duggirala |
| 7,292,968 | B2 | 11/2007 | Wu et al. |
| 7,307,449 | B1 | 12/2007 | Redgrave et al. |
| 7,308,418 | B2 | 12/2007 | Malek et al. |
| 7,313,777 | B1 | 12/2007 | Yang et al. |
| 7,318,216 | B2 | 1/2008 | Diab |
| 7,330,856 | B2 | 2/2008 | Nicastro et al. |
| 7,362,332 | B2 | 4/2008 | Gritz |
| 7,363,605 | B1 | 4/2008 | Kondratyev et al. |
| 7,367,006 | B1 | 4/2008 | O'Riordan et al. |
| 7,383,382 | B2 | 6/2008 | Powell et al. |
| 7,386,521 | B2 | 6/2008 | Adir et al. |
| 7,398,495 | B1 | 7/2008 | Schreiber et al. |
| 7,401,310 | B1 | 7/2008 | Thaden et al. |
| 7,472,103 | B1 * | 12/2008 | Yang .......................... 706/52 |
| 7,478,365 | B2 | 1/2009 | West et al. |
| 7,610,256 | B1 * | 10/2009 | Yang .......................... 706/52 |

OTHER PUBLICATIONS

Inferring rule-based strategies in dynamic judgment tasks: toward a noncompensatory formulation of the lens model, Rothrock, L.; Kirlik, A.; Systems, Man and Cybernetics, Part A: Systems and Humans, IEEE Transactions on vol. 33, Issue: 1 Digital Object Identifier: 10.1109/TSMCA.2003.812601 Publication Year: 2003, pp. 58-72.*

An Applied Method for Inferring Knowledge Rules, Fuyan Liu; Intelligent Control and Automation, 2006. WCICA 2006. The Sixth World Congress on vol. 2 Digital Object Identifier: 10.1109/WCICA. 2006.1714256 Publication Year: 2006, pp. 6115-6119.*

Web Image Annotation Based on the Decision Rules Inferred by the Statistical Analysis of Web Pages, Joohyoun Park; Giseok Choe; Jongwon Lee; Jongho Nang; Computer and Information Technology, 2007. CIT 2007. 7th IEEE International Conference on Digital Object Identifier: 10.1109/CIT.2007.123 Publication Year: 2007, pp. 183-188.*

Almudevar, Anthony, "Efficient Coding of Labelled Graphs," IEEE Information Theory Workshop, ITW'07, pp. 523-528 (2007).

Hsu, D. Frank, "Graph Containers, Information Delay, and Network Vulnerability," Proceedings of the 18th International Conference on Advanced Information Networking and Application, vol. 1:16-21 (2004).

Karsai, Gabor et al., "Specifying Graphical Modeling Systems Using Constraint-based Metamodels," Proceedings of the 2000 IEEE International Symposium on Computer-Aided Control System Design, pp. 89-94 (2000).

Morisio, M. et al., "IusWare: a methodology for the evaluation and selection of software products," IEE Proc.-Softw. Eng., vol. 144(3):162-174 (1997).

Radovilsky, Yan et al., "Efficient Deterministic Approximation Algorithms for Non-myopic Value of Information in Graphical Models," 2006 IEEE International Conference on Systems, Man, and Cybernetics, vol. 3:2559-2564 (2006).

Surles, Mark C., "Parallel Constrained Minimization For Interactive Protein Modeling," Proceedings of the Twenty-Seventh Annual Hawaii International Conference on System Siences, pp. 183-192 (1994).

Tobor, Ireneusz et al., "Multi-Scale Reconstruction of Implicit Surfaces with Attributes from Large Unorganized Point Sets," Proceedings of the Shape Modeling International, pp. 19-30 (2004).

Zhao, Jinhong et al., "Research and Design of an Executable Modeling Language Based on MOF," 9th International Conference on Computer-Aided Industrial Design and Conceptual Design, pp. 399-404 (2008).

* cited by examiner

| Parameter Attribute | Registered Parameter Attribute Value |
|---|---|
| Type | {Expression, Value} |
| Data Type | {Double, Single, Fixed-point, Integers, Custom, Boolean} |
| Complexity | {Real, Complex} |
| Dimension | {Scalar, Vector, 2-d Matrix, n-d Matrix} |
| Range | {Minimal, Maximal} |
| Nan (not a number) | {Allow, Disallow} |
| Inf (infinity) | {Allow, Disallow} |
| Monotonicity | {Strictly Monotonic, Monotonic, Non-Monotonic} |
| Sign | {Negative, Positive, Non-positive, Non-negative, Zero, Non-zero} |
| Integer Value | {Integer, Non-integer, Decimal} |
| aNumeric | {Numeric, String} |
| Enum Value | {Allowed enum value array} |
| Boolean Value | {Boolean, Non-Boolean} |

*Fig. 4A*

| Parameter Dependency Attribute | Registered Parameter Dependency Attribute Value |
|---|---|
| Type | {Homogeneous, Heterogeneous} |
| Data Type | {Homogeneous, Heterogeneous} |
| Complexity | {Homogeneous, Heterogeneous} |
| Dimension | {Homogeneous, Heterogeneous} |
| Relation | {<=, >=, !=, <, >, ==} |
| Sign | {Homogeneous, Heterogeneous} |
| Numericness | {Homogeneous, Heterogeneous} |

REGISTERING RULES FOR ENTITY ATTRIBUTES FOR VALIDATION AND INFERENCE

RELATED APPLICATIONS

This application is a continuation of U.S. application Ser. No. 11/841,871, entitled "Registering Rules for Entity Attributes for Validation and Inference," filed Aug. 20, 2007, which is a continuation of U.S. application Ser. No. 11/317,927, entitled "Registering Rules for Entity Attributes for Validation and Inference," filed Dec. 23, 2005, now U.S. Pat. No. 7,472,103, issued Dec. 30, 2008, the contents of which are incorporated herein by reference.

TECHNICAL FIELD OF THE INVENTION

The present invention relates to registering rules for attributes of an entity for validation and inference in a block diagram modeling application.

BACKGROUND OF THE INVENTION

Generally, graphical analysis, simulation, and execution methods are used in modeling, design, analysis, and synthesis of engineered systems. These methods provide a visual representation of a model, such as a block diagram. The visual representation provides a convenient interpretation of model components and structure. The visual representation also provides a quick intuitive notion of system behavior. The components of a block diagram also can capture the mathematical representation of the actual system being modeled.

Various classes of block diagrams describe computations that can be performed on application specific or general purpose computational hardware, such as a computer, microcontroller, field-programming gate array (FPGA), and custom hardware. Classes of such block diagrams include time-based block diagrams such as those found within Simulink® from the MathWorks, Inc. of Natick, Mass., state-based and flow diagrams such as those found within Stateflow® from the MathWorks, Inc. of Natick Mass., entity flow network diagrams such as those found within SimEvents from the MathWorks, Inc. of Natick, Mass., and data-flow diagrams. A common characteristic among these various forms of block diagrams is that they define semantics on how to execute the diagram.

Block diagram modeling has spawned a variety of software products that cater to various aspects of dynamic system analysis and design. Such products allow users to perform various types of tasks including constructing system models through a user-interface that allows drafting block diagram models, allowing augmentation of a pre-defined set of blocks with users' custom-built blocks, the use of the block diagram model to compute and trace the temporal evolution of the dynamic system's outputs ("executing" the block diagram), and automatically producing either deployable software systems or descriptions of hardware systems that mimic the behavior of either the entire model or portions of it.

Currently in Simulink®, each block is responsible for validating entities within the block, hence each block needs to maintain its own entity checking code. As a result, for custom-built blocks, such as S-Function blocks, a user needs to write an entity checking code for each of the custom-built blocks. Although this provides the user with the flexibility of how one wants to validate block entities, it is sometimes cumbersome and error prone due to unnecessary duplicate efforts or insufficient tests.

Additionally, each block is responsible for inferring block entity attributes, hence each block needs to maintain its own entity inference code. As a result, for custom-built blocks, such as S-Function blocks, a user needs to write an entity inference code for each of the custom-built blocks. Although this provides the user with the flexibility of how one wants to infer block entity attributes, it is sometimes cumbersome and error prone due to unnecessary duplicate efforts or insufficient tests.

SUMMARY OF THE INVENTION

The present invention provides a method and system for registering rules for attributes of an entity with an entity validation and inference unit, where the attributes of an entity also include behavior of the entity and relations of the entity with respect to one or more other entities. An entity is any aspect of a model that has at least a property that can have a valuation. An entity attribute is a property of a valid value for the corresponding entity. The entity validation and inference unit can further validate input values for an entity using the associated registered entity attributes rules. The entity validation and inference unit can further match the settings of an entity with the condition parts of the registered rules and execute the action parts of those registered rules whose conditions are satisfied. The entity validation and inference unit can also provide information regarding the registered rules in response to a query. The present invention may maintain the flexibility of custom-built blocks and relieves a user the burden to write code to validate and/or infer values for block entities. The present invention may also provide a mechanism for a user to query the entity validation and inference unit regarding valid values for an entity or a rule associated with the entity.

In one embodiment of the present invention, a method for registering rules for attributes of an entity with a block diagram modeling application in a computing device is provided. The method includes the steps of providing a block diagram modeling application and providing a first entity to use in the block diagram modeling application. The method also includes the step of receiving input defining one or more rules for attributes of the first entity, the one or more rules relating to one or more attributes for the first entity. The method further includes the step of registering the one or more rules with an entity validation and inference unit.

In one aspect of the present invention, the first entity is a parameter associated with a block or a signal. The block can further be a user-defined block. The entity validation and inference unit may be part of the block diagram modeling application. In another aspect of the present invention, the method further includes the steps of receiving input specifying a value for the first entity and validating the value by the entity validation and inference unit using the registered one or more rules. In another aspect of the present invention, the method further includes the step of inferring a value for the first entity by the entity validation and inference unit using the registered one or more rules. In a further aspect of the present invention, the method further includes the step of generating an entity validation or inference code by the entity validation and inference unit using the registered one or more rules. In yet another aspect of the present invention, the method further includes the steps of providing an error message indicating the received input is an invalid value for the first entity and displaying the registered one or more registered rules to suggest how to correct the invalid value. In yet another aspect of the present invention, the method further includes the steps of providing an error message if an error is encountered when a chain of one or more registered rules are executed by the entity validation and inference unit, indicating how the chain of one or more registered rules leads to the error given a current setting of the first entity and displaying the chain of one or more registered rules to show how to correct the error. In still another aspect of the present invention, the one or more attributes include at least one of an entity attribute, an entity type, data type, complexity, dimension, allowable range, monotonicity, sign, and numericness. In yet another aspect of the present invention, the one or more attributes include a relation with respect to a second entity. In still another aspect of the present invention, the one or more registered rules include a relation between attributes of the first entity. In yet another aspect of the present invention, the one or more registered rules include a behavior of the first entity. In yet a further aspect of the present invention, the method further includes the steps of querying the entity validation and inference unit regarding the first entity and in response to the query, returning by the entity validation and inference unit the registered one or more rules associated with the first entity.

In another aspect of the present invention, a computing device includes a storage medium for storing instructions for performing a method for registering rules for attributes of an entity with a block diagram modeling application is provided. The method includes the steps of providing a block diagram modeling application and providing a first entity to use in the block diagram modeling application. The method also includes the step of receiving input defining one or more rules of the first entity, the one or more rules describing one or more attributes for the first entity. The method further includes the step of registering the one or more rules with an entity validation and inference unit.

In yet another embodiment of the present invention, a system for registering rules for attributes of an entity with a block diagram modeling application is provided. The system includes a block diagram modeling application providing a first block and an entity validation and inference unit in communication with the block diagram modeling application to register one or more rules for a first entity associated with the first block and capable of validating an input value for the first entity using the registered one or more rules. The entity validation and inference unit may also infer attributes, relations, and behaviors of the first entity using the registered one or more rules.

In one aspect of the present invention, the entity validation and inference unit includes an entity validation and inference code generator that generates code to validate and/or infer the input value using the registered one or more rules. In another aspect of the present invention, the block diagram modeling application includes a query mechanism to query the entity validation and inference unit regarding valid values for the first entity. In yet another aspect of the present invention, the block diagram modeling application includes a query mechanism to query the entity validation and inference unit regarding attributes, relations, and behaviors of the first entity. In still another aspect of the present invention, the entity validation and inference unit is a part of the block diagram modeling application.

In still another embodiment of the present invention, a method for registering rules for the attributes, relations, or behaviors of a first entity in a modeling application is provided. The method includes the step of receiving input defining one or more rules associated with the first entity, the one or more rules describing attributes, relations, and behaviors of the first entity. The method also includes the step of registering at least one of a compile-time rule and a run-time rule for the first entity.

In one aspect of the present invention, the compile-time rule is used to validate or infer an attribute of the first entity at compile-time, whereas the run-time rule is used to validate or infer an attribute of the first entity at run-time. The compile-time rule can describe different valid values, different relations, or different behaviors for the first entity comparing to the run-time rule. In another aspect of the present invention, the first entity is a parameter of a signal in a block diagram model.

In yet another embodiment of the present invention, a computing device including a block diagram modeling application and a storage medium storing instructions for performing a method for registering rules for attributes of a first entity in the modeling application is provided. The method includes the step of receiving input defining one or more rules describing attributes, relations, and behaviors for the first entity. The method also includes the step of registering at least one of a compile-time rule and a run-time rule for attributes of the first entity.

In still another embodiment of the present invention, a method for registering rules associated with an entity within a block diagram modeling application is provided. The method includes the step of providing a block diagram modeling application. The method may also include the step of receiving input defining a first rule, wherein the first rule is an inference rule comprising a condition and an action. The method may also include the step of receiving input defining a first rule for the attributes of an entity, wherein the first rule includes prepositional logic, a first-order logic, events and temporal constraints, a probability associated rule, fuzzy logic, or a combination thereof. The method further includes the step of registering the first rule with an entity validation and inference unit.

In one aspect of the present invention, the method further includes the step of applying the first rule by the entity validation and inference unit to propagate and validate compilation information. The method can also include the step of applying the first rule by the entity validation and inference unit during code generation of a model. The method may also include the step of applying the first rule by the entity validation and inference unit in an intermediate representation of a model. In another aspect of the present invention, the method further includes the step of checking the first rule against one or more existing rules for conflict. Each rule may be assigned a priority.

In yet another embodiment of the present invention, a method for registering rules for behaviors of a graphical dialog associated with a block diagram modeling application is provided. The method includes the steps of providing a block diagram modeling application and a dialog to use in the block diagram modeling application. The method also includes the step of providing a first entity associated with the dialog. The method further includes the step of receiving input defining a rule on how the dialog behaves regarding a plurality of attributes associated with the first entity. The method also includes the step of registering the rule with an entity validation and inference unit.

In yet another embodiment of the present invention, a method for registering rules for behaviors of a dynamic dialog associated with a block diagram modeling application is provided. The method includes the steps of providing a block diagram modeling application and a first entity to use in the block diagram modeling application. The method also includes the step of providing a dynamic dialog to use with the first entity. The method further includes the step of receiving input defining a rule on how the dynamic dialog behaves regarding a plurality of attributes associated with the first entity. The method also includes the step of registering the rule with an entity validation and inference unit.

In still another embodiment of the present invention, a computing device including a block diagram modeling application and a storage medium storing instructions for performing a method for registering rules associated with an entity that is provided to use in the block diagram modeling application is provided. The method includes the step of receiving input defining a first rule, wherein the first rule comprises a condition and an action. The method also includes the step of registering the first rule with an entity validation and inference unit.

In a further embodiment of the present invention, a storage medium storing instructions for causing a computing device to register rules for behaviors of a graphical dialog associated with an entity that is provided to use in the block diagram is provided. The instructions include the instruction for receiving input defining a rule on how the dialog behaves regarding a plurality of attributes associated with the entity. The instructions also include instruction for registering the rule with an entity validation and inference unit.

In a further embodiment of the present invention, a computing device including a block diagram modeling application and a storage medium storing instructions for performing a method for registering rules for behaviors of a dynamic dialog associated with an entity that is provided to use in the block diagram modeling application is provided. The method includes the step of receiving input defining a rule on how the dynamic dialog behaves regarding a plurality of attributes associated with the entity. The method also includes the step of registering the rule with an entity validation and inference unit.

BRIEF DESCRIPTION OF THE FIGURES

The foregoing and other objects, aspects, features, and advantages of the invention will become more apparent and may be better understood by referring to the following description taken in conjunction with the accompanying drawings, in which.

DETAILED DESCRIPTION

The illustrative embodiments are described for illustrative purposes relative to a block diagram modeling application such as Simulink® from The MathWorks, Inc. of Natick, Mass. Nevertheless, those skilled in the art will appreciate that the principles and concepts described below are equally applicable to other graphical modeling applications, such as Rhapsody from I-Logix Inc., TargetLink and Real-Time Interface from dSPACE GmbH, RT-LAB™ from Opal-RT Technologies, Inc., EXITE from EXTESSY AG, LabVIEW®, MATRIXx from National Instruments, Inc., SystemVue™ from Eagleware-Elanix Corporation, Mathematica® from Wolfram Research, Inc., Mathcad of Mathsoft Engineering & Education Inc., COSSAP from Synopsys, Inc., HyperSignal® from Hyperception, Inc., Dymola from Dynasim AB, or Maple™ from Maplesoft, a division of Waterloo Maple Inc. Furthermore, one ordinarily skilled in the art will appreciate that the present invention may apply to any graphical modeling environment, such as one providing modeling with a Unified Modeling Language (UML), Hardware Description Language (HDL), or that provides a physics modeling domain. Furthermore, those skilled in the art will also appreciate that the principles and concepts are equally applicable to non-graphical modeling applications as well.

Figure 1:
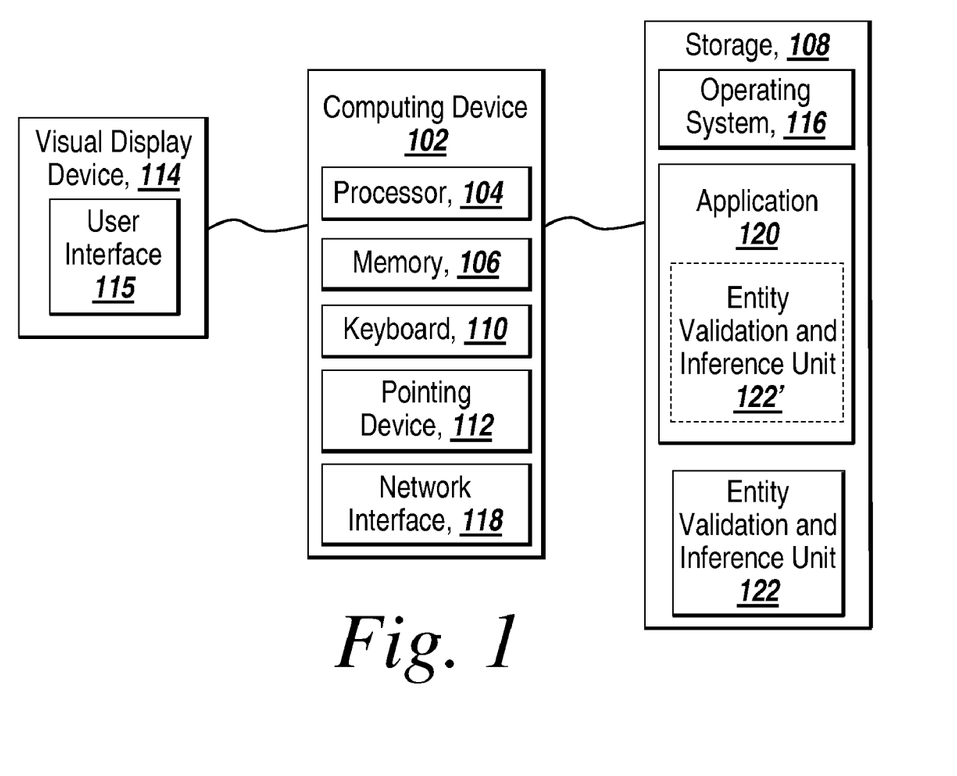
FIG. 1 is a block diagram of a computing device suitable for practicing an embodiment of the present invention.

FIG. 1 depicts an environment suitable for practicing an illustrative embodiment of the present invention. The environment includes a computing device 102 having memory 106, on which software according to one embodiment of the present invention may be stored, processor 104 for executing software stored in the memory 106, and other programs for controlling system hardware. The memory 106 may comprise a computer system memory or random access memory such as DRAM, SRAM, EDO RAM, etc. The memory 106 may comprise other types of memory as well, or combinations thereof. A user may interact with the computing device 102 through a visual display device 114 such as a computer monitor, which may include a user interface 115. The computing device 102 may include other I/O devices such a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals. The computing device 102 may further comprise a storage device 108, such as a hard-drive or CD-ROM, for storing an operating system 116, entity validation and inference unit 122, and other related software, and for storing application 120, such as Simulink®. Those skilled in the art will appreciate that entity validation and inference unit 122 is adaptable to be included as part of the application 120 (such as entity validation and inference unit 122') or a stand alone application that responds to calls from the application 120. Additionally, the operating system 116 and application 120 can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The computing device 102 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein.

Figure 2:
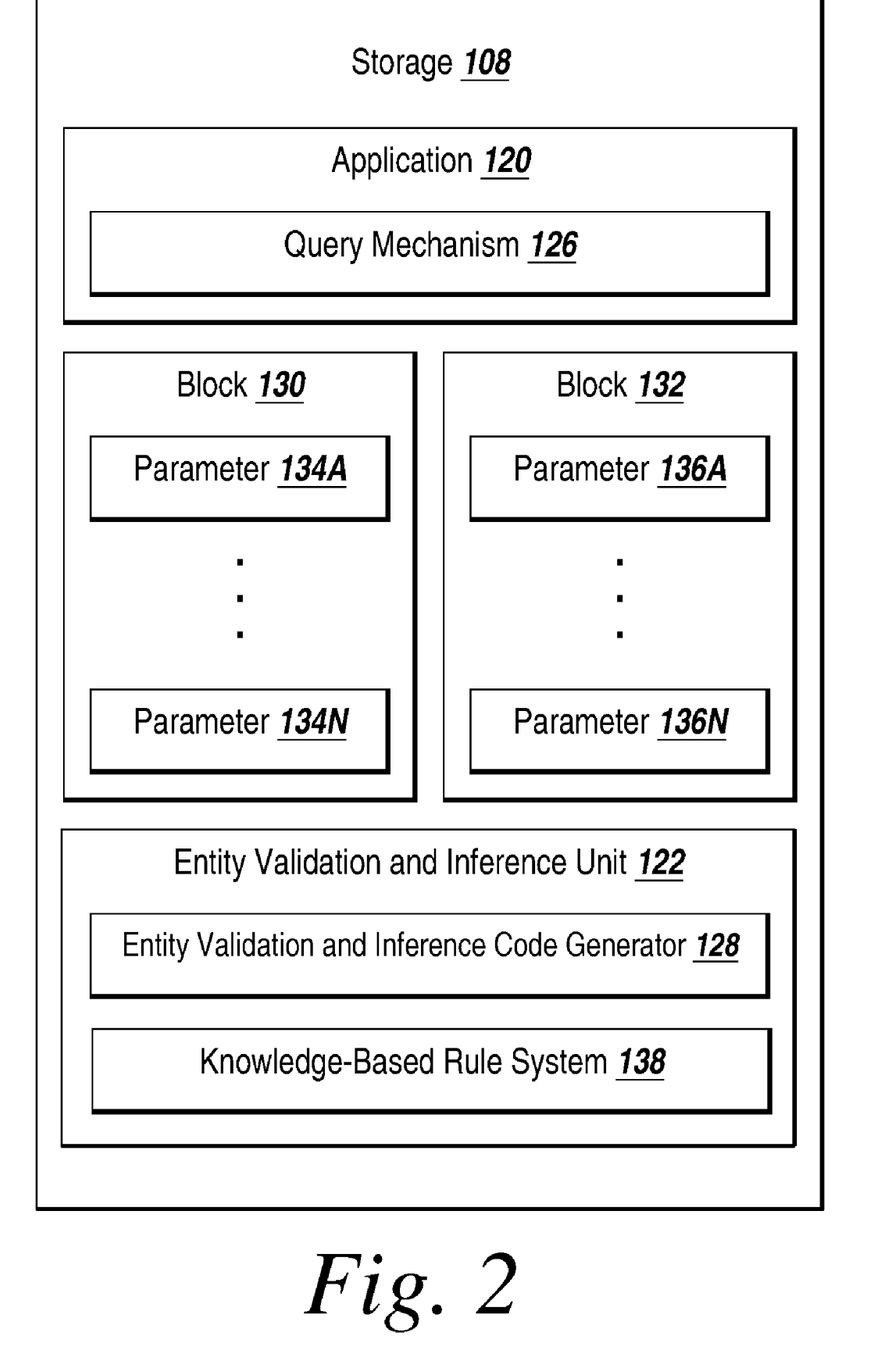
FIG. 2 is a block diagram of a system suitable for practicing an embodiment of the present invention.

FIG. 2 illustrates a more detailed example of the contents of storage 108. The storage 108 includes entity validation and inference unit 122. Entity validation and inference unit 122 can optionally include an entity validation and inference code generator 128 for generating code to check if an input value is a valid one for a specific entity and/or to infer attributes of a specific entity after entity validation and inference unit 122 has at least one or more registered rules for the specific entity. Entity validation and inference unit 122 further includes a knowledge-based rule system 138 that applies user-specified rules for entity inference and validation. The knowledge-based rule system 138 can apply user specified rules during compilation and/or code generation of a model. The knowledge-based rule system 138 can also be used to apply rules about how a graphical dialog or a dynamic dialog should behave.

An entity is any aspect of a model that has at least a property that can have a valuation. In a graphical model, an entity can be, but not limited to, a model, a subsystem, a block, a model reference block, a signal, a bus signal, a struct signal, a parameter, a block parameter, a model option, a subsystem option, a block option, a block display option, a signal display option, an optimization setting, a graphical dialog, a dynamic dialog, and a relative tolerance of a numerical solver. For each entity, there are associated attribute(s), relation(s) with other entities, and behavior(s). An entity attribute is a property of a valid value for an entity. The entity attribute also describes a type of valid values that the entity can accept as inputs. An entity relation describes a relationship of one entity to one or more other entities. Specifically, the relationship can be one that describes a rule how an attribute of one entity is affected by one or more attributes of one or more other entities. For example, how the data type of a block output is derived from the data type of the block input. A behavior of an entity can describe how the entity appearance and/or associated attribute options change in view of one or more events, such as an entity or associated attribute being visible or invisible in a dynamic dialog (discussed later), change in color to indicate an execution state of the entity, the option of a zero-crossing detection being enabled or disabled.

Still referring to FIG. 2, application 120 can include an query mechanism 126 that queries entity validation and inference unit 122 regarding information about what are valid values for a particular entity of a specific entity in a model. Alternatively, the query mechanism 126 can query an entity in the model what are valid values for a particular entity. The query mechanism 126 can also be used to query about any rules specified for any attribute, relation, and behavior of an entity. An application programming interface (API) can be used to query entities, rules, entity relations, and entity attributes.

A rule is defined herein as a way to represent knowledge. It can capture a fact about an entity, a relationship between entities, or a behavior of an entity. It can be an inference rule that includes both a condition and an action, where the condition is a predicate that needs to be satisfied and the action is taken when the condition is met. A rule hence can be represented using an IF-THEN clause. A rule can also be represented using prepositional logic, a first-order logic, events and temporal constraints, a probability associated rule, or fuzzy logic. In one aspect of the present invention, the evaluation and execution of the rules can be dependent upon certain model processing operations. For example, a rule may only be evaluated and/or executed when the model is being loaded into the memory. Other processing operations include, but are not limited to, displaying the model in a graphical user interface, editing the graphical model, compiling the graphical model, executing the graphical model, running analysis or advisor tools for the model, generating and displaying diagnostic message for the model, running debugger on the model, and generating an intermediate representation (IR) or code for software or hardware applications from the model.

In one embodiment of the present invention, the knowledge-based rule system 138 includes a rule base, a rule interpreter parsing the rule base, and a rule inference engine executing the rules. Query mechanism 126 can provide means to query the entity validation and inference unit 122 or knowledge-based rule system 138 regarding any rule associated with an entity. The knowledge-based rule system can support different forms of rules, including but not limited to, IF-THEN rules, propositional logic, first-order logic, events and temporal constraints, probability associated with rules, fuzzy logic. Diagnostic messages can be optionally generated based on the chain of executed rules to assist in diagnosing an undesired result yielded by the inference engine. Knowledge-based rule system 138 can further include or use an analysis tool that is used to validate rules, detect conflicts between rules, and resolve conflicts.

To illustrate a conflict, consider the following set of rules:

Rule 1: If parameter A is visible, then parameter B should be set to be invisible.

Rule 2: If parameter B is invisible, then parameter A should be set to be invisible.

Rule 3: If parameter A is invisible, then parameter B should be set to be visible.

Rule 4: If parameter B is visible, then parameter A should be set to be visible.

Hence, given that a user set parameter A to be visible, Rule 1 requires that parameter B to be invisible. However, Rule 2 requires parameter A to be invisible when parameter B is invisible. When Rule 3 is considered, parameter B is set to visible. Lastly, Rule 4 makes parameter A visible because parameter B is visible. Hence, these rules resulted in an undesired infinite loop of setting parameter A and B visible and invisible. Additionally, if there are only Rule 1 and Rule 2, the user input of making parameter A visible will always be ignored, which can also cause undesired results.

In addition to the undesired infinite loop, other examples of conflicts can include: conflicting of rules, such as conditions of two rules are satisfied but one rule would set parameter A to be visible, whereas the other rule would set parameter A to be invisible, and incomplete rules, such as a data type rule may not specify how one particular input port data type is to be inferred and resulted in that the output port data type cannot be inferred from the input port data type.

When there is a conflict, a resolution can be automatically applied by the knowledge-based rule system 138. For example, a rule can be removed to resolve a conflict, a default rule can be applied in case of an incomplete rule, a stop criterion can be provided in case of infinite loop, and rule application can be halted to let a user to resolve the conflict.

One of ordinary skill in the art will appreciate that the functions performed by the knowledge-based rule system 138, entity validation and inference unit 122, entity validation and inference code generator 128, query mechanism 126 can be performed by one or more software modules. Hence, the present invention is not limited to a specific module performing a specific task.

In one embodiment of the present invention, block parameters can be validated by registering attributes rules with the entity validation and inference unit 122. Block 130 and block 132 can be created by application 120 for use in a block diagram model. Block 130 and block 132 can be built from a pre-defined block provided with application 120 or a custom-built block. Each of blocks 130 and 132 can have one or more parameters. In one preferred embodiment of the present invention, each block registers its parameters and associated attribute rules with entity validation and inference unit 122. In one embodiment of the present invention, a graphical user interface, such as the one shown in FIG. 3A, can be used to register a parameter and the associated rules of parameter attributes for a block. One of ordinary skill in the art will appreciate that a similar graphical user interface can also be used to register rules associated with attributes of other entities in a block or a model, and the present invention is not limited to the registration of rules for parameter attributes of blocks.

Figure 3A:
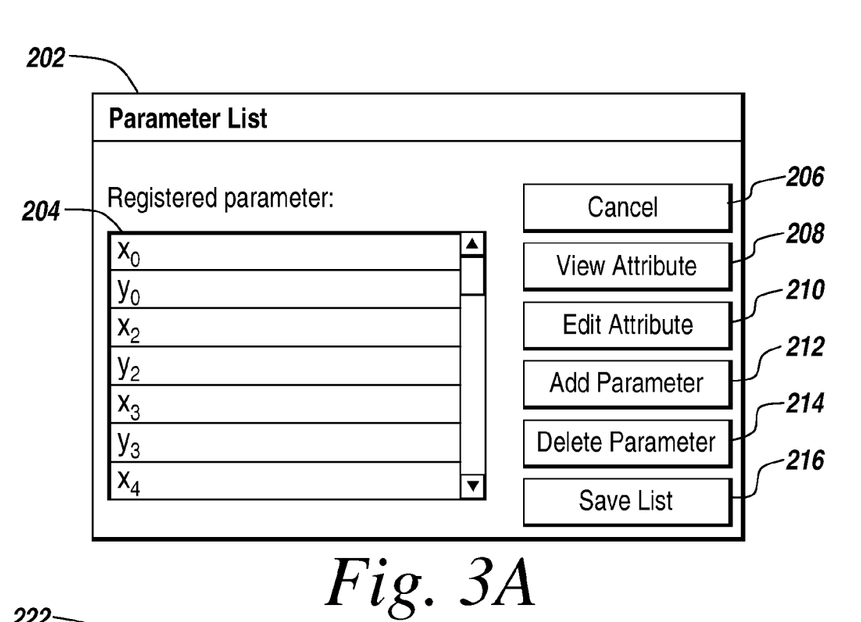
FIG. 3A illustrates an exemplary graphical user interface for registering entity rules according to one embodiment of the present invention.

FIG. 3A illustrates an exemplary graphical user interface for viewing and registering parameters and associated rules for parameter attributes. Parameter list window 202 includes a registered parameter table 204 that lists the one or more registered parameters. In a preferred embodiment of the present invention, all the parameters listed in the registered parameter table 204 are associated with one block. Alternatively, each parameter can have an indicator that shows which block the parameter belongs to. One of ordinary skill in the art will appreciate that there are many ways that one can cause the parameter list window 202 to open for viewing and editing, such as right clicking on a graphical representation of a block and choosing the parameter list item in the right click menu. Parameter list window 202 further includes a view attribute button 208 for viewing attribute rules of a parameter highlighted in the registered parameter table 204. Parameter list window 202 includes an edit attribute button 210 that allows a user to edit attribute rules of a parameter highlighted in the registered parameter table 204. Add parameter button 212 and delete parameter button 214 can also be included in the parameter list window 202 to provide a user with the functionality of adding a new parameter to the registered parameter table 204 and deleting an existing parameter from the registered parameter table 204, respectively. The parameter list window 202 can also include a cancel button 206 and save list button 216 for respectively canceling and saving any changes to the registered parameter table 204.

Figure 3B:
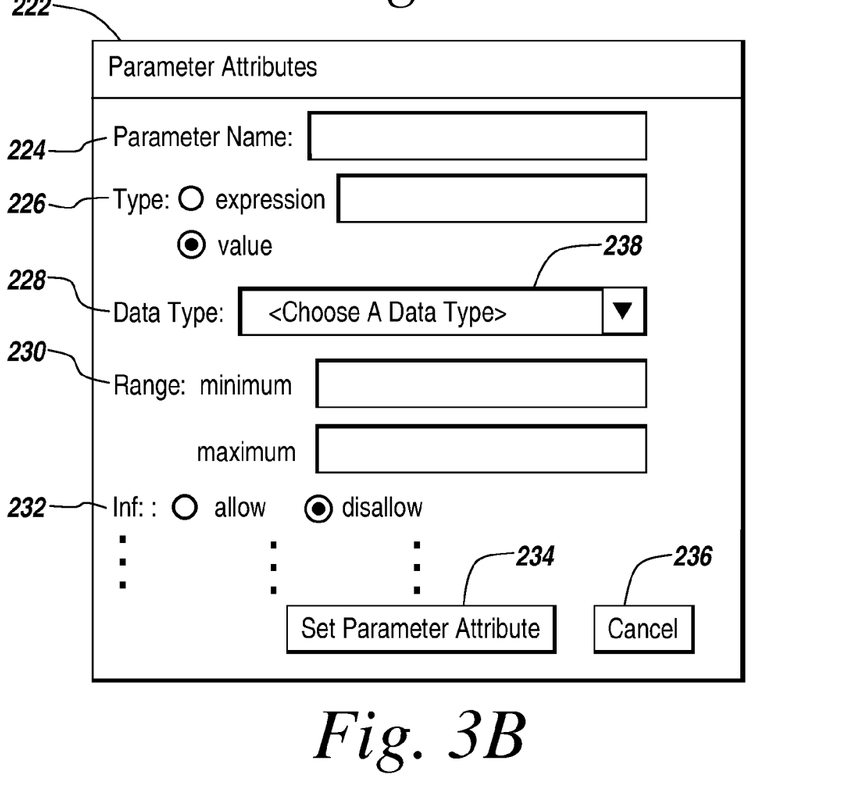
FIG. 3B illustrates an exemplary graphical user interface for specifying rules associated with entity attributes according to one embodiment of the present invention.

FIG. 3B illustrates an exemplary graphical user interface for editing or setting rules for attributes of a parameter in a parameter attributes window 222. One of ordinary skill in the art will appreciate that there are many ways to cause the parameter attributes window 222 to open, such as clicking on the edit attribute button 210 or the add parameter button 212. Parameter attributes window 222 includes a parameter name field 224 for a user to input or change the name of a parameter. Parameter attributes window 222 can include a type field 226 for a user to choose the type of the parameter. If the type of the parameter is an expression, the user can enter the expression of the parameter, such as A+B, where A and B are names of other parameters. Alternatively, the user can also choose the type of the parameter to be a value in type field 226. One of ordinary skill in the art will appreciate that type field 226 may include additional options for a user to select as a type for the parameter specified in the parameter name field 224. Parameter attributes window 222 can also include a data type field 228 that allows a user to choose a data type from a combo box 238 for the parameter specified in the parameter name field 224. Combo box 238 can include data type options, such as double (double precision value), single (single precision value), integer, Boolean, custom, or fixed point. Parameter attributes window 222 further includes range field 230 that allows a user to enter the minimum and maximum values that a parameter can have. Parameter attributes window 222 can also include fields, such as Inf (infinity) field 232, that allow a user to choose if a specific type of input is allowed or disallowed. One of ordinary skill in the art will appreciate that depending on the application, a parameter may be allowed to accept values of different types. For example, if a parameter can accept any numeric values, such as double, single, and integer, then parameter attributes window 222 can permit a user to select multiple data type from the combo box 238. Therefore, the options given for different fields (224, 226, 228, 230 and 232) in the parameter attributes window 222 does not need to be exclusive from one another. Parameter attributes window 222 can include other attribute fields, such as those listed in FIGS. 4A and 4B. A set parameter attribute button 234 and a cancel button 236 can also be included in the parameter attributes window 222 for a user to confirm or cancel attribute settings for the parameter specified in the parameter name field 224.

In another aspect of the present invention, a function is invoked to perform registration of rules associated with entity attributes. For example, one or more property value pairs may be used as arguments to a function to register entity attribute rules with entity validation and inference unit 122, such as register(field1, value1, field2, value2, . . . );

where a field and a value form a property value pair. A field can be, but not limited to, any entity attribute and any field listed in the parameter attribute column 402 in FIG. 4A, and a value can be, but not limited to, any possible entity attribute value and any value listed in the registered parameter attribute value column 404 in FIG. 4A.

Figure 4A:
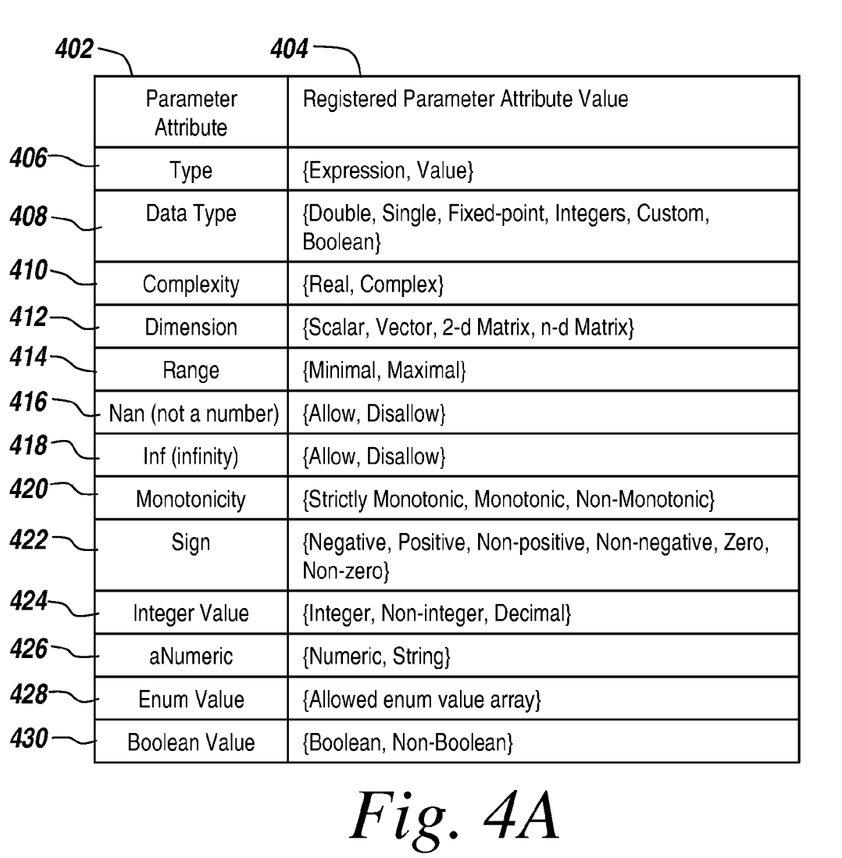
FIG. 4A shows a table with entity attributes and corresponding possible values associated with rules for the entity attributes that are suitable to practice with the present invention.

FIG. 4A shows a table including possible parameter attribute fields in the first column 402 and possible corresponding values for each field in the second column 404. A parameter can have a complexity attribute field 410 describing the parameter as having a complex number value or real number value. A parameter can also have a dimension attribute field 412 that limits a valid value for the parameter as a scalar number, vector, two-dimensional matrix, or n-dimensional matrix, where n is an integer greater than zero. A nan attribute field 416 can also be specified for a parameter to indicate if a value that is not a number can be accepted as a valid value. A parameter can also have a monotonicity attribute field 420 specifying that the parameter is strictly monotonic (increasing or decreasing), monotonic (increasing or decreasing), or not monotonic. For example, strictly monotonic increasing values can be 1, 2, 3, 4, 6, 7, whereas monotonic increasing values can be 1, 1, 2, 2, 3, 3. In other words, strictly monotonic does not allow values that are equal to the previous value, whereas monotonic does. A sign attribute field 422 can be used to restrict a parameter to have valid values that are only negative, positive, non-positive, non-negative, zero, or non-zero. For a parameter that should only accept integer values, an integer value field 424 can be used to indicate if the integer values should be represented in an integer, double, or non-integer format. A parameter can also have an anumeric attribute field 426 to indicate if the parameter is numeric or string (non-numeric). A Boolean attribute field 430 can also be used to indicate if a parameter accepts Boolean value. A parameter attribute can also be used to indicate if an application specific data type is allowed. For example, an enum attribute 428 can be used to indicate if a parameter can accept an input value of an enum type, which is a list of discrete values that the parameter can accept. For example, if a user specifies in an enum attribute that a parameter can be any of the values of {1, 5, 6}, then any other values that are not either 1, 5, or 6 will be invalid values for the parameter. One of ordinary skill in the art will appreciate that the list of possible parameter attributes in FIG. 4A is not exhaustive and the ones listed are merely used as illustrative examples for better understanding of the spirit and scope of the present invention. One of ordinary skill in the art will also appreciate that the list of possible parameter attribute values in FIG. 4A is not exhaustive and the ones listed are merely exemplary values.

Figure 4B:
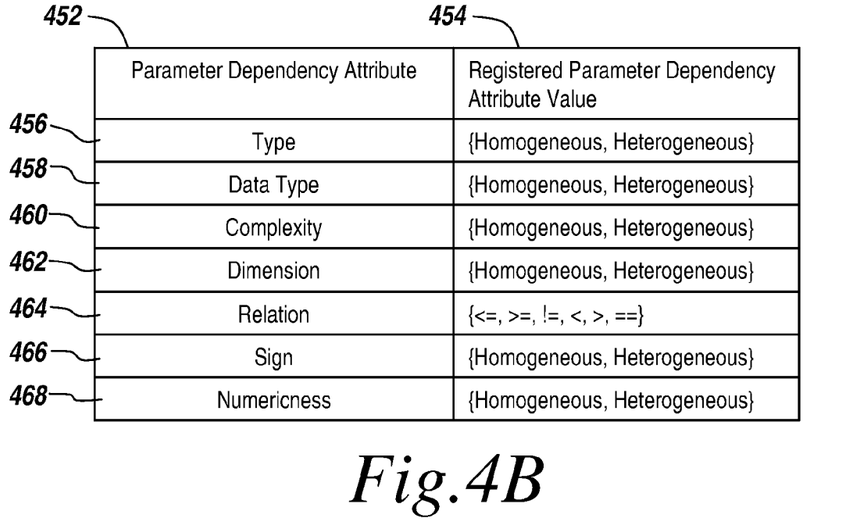
FIG. 4B shows a table with entity relation attributes and corresponding possible values associated with rules for the entity relation attributes that are suitable to practice with the present invention.

FIG. 4B illustrates another type of attribute rules that can be used to describe the relationship between one or more parameters according to one embodiment of the present invention. Referring back to FIG. 2, blocks 130 and 132 can have one or more parameters 134A-N and 136A-N, respectively. A user may want to keep a certain relationship among parameters 134A-N in block 130 or enforce a certain relationship between a parameter from block 130 and another parameter from block 132, such as having consistent data type or one parameter consistently having a greater value than the another parameter. The present invention provides the use of parameter dependency attributes for this purpose. FIG. 4B provides an exemplary list of possible parameter relation attributes that is suitable to use with the example of registering block parameters attribute rules with the entity validation and inference unit 122. One of ordinary skill in the art will recognize that the parameter dependencies can be specified between not only two parameters but also among more than two parameters. One of ordinary skill in the art will appreciate that the present invention is not limited to parameter dependency attributes and other entity relations can be used with the present invention. One of ordinary skill in the art will also appreciate that the present invention is not limited to the use of dependency attributes to describe a relationship between two or more entities and other methods, such as a rule-based system, can be used instead to describe the relationship between two or more entities.

Still referring to FIG. 4B, type dependency attribute 456 allows a user to choose if two or more parameters must have the same type (homogeneous) or if they can have different type (heterogeneous). A parameter can also use a data type dependency attribute 458 to specify that it should have the same (homogeneous) or different (heterogeneous) data type relative to another parameter. A complexity dependency attribute 460 can be used to indicate if two or more parameters should have the same (homogeneous) or different (heterogeneous) complexity attribute. A dimension dependency attribute 462 can be used to denote that if a parameter should have the same or different dimension when comparing to another parameter. A sign dependency attribute 466 can also be used to indicate if a parameter should have the same or different sign with another parameter. A parameter can also have a numericness parameter dependency attribute 468 to signify that it has the same or different numericness attribute with another parameter. One of ordinary skill in the art will appreciate that there are many other attributes one can specify to be the same or different between two or more parameters. Additionally, a relation dependency attribute 464 can be used to indicate a value relationship between two parameters. The relation dependency can require one parameter having a value that is greater, smaller, not greater, or not smaller than a value of another parameter. Additionally, the relation dependency attribute can also require one parameter to be equal or not equal to another parameter in value. The relation dependency can also be described with a more elaborate expression to define a constraint, such as the value of one parameter should be two times the value of the other parameter plus three if the value of the other parameter is larger than zero. The parameter dependency attributes are used to describe a relationship between two or more parameters, where the parameters are not necessarily used in the same block. One of ordinary skill in the art will appreciate that the list of possible parameter dependency attributes in FIG. 4B is not exhaustive and the ones listed are merely used as illustrative examples for better understanding of the spirit and scope of the present invention. One of ordinary skill in the art will also appreciate that the list of possible parameter dependency attribute values in FIG. 4B is not exhaustive and the ones listed are merely exemplary values.

Entity validation can occur at different stages as required by the user and/or the model. A user can choose to validate an input value for an entity at the time the input value is given. A user can also choose to validate all input values for all entities together. Certain validation may be required by the model or the user to occur at compile-time or run-time. For example, an entity can register its value attribute rules for an input/output signal and the entity validation and inference unit 122 will validate and/or infer the signal value at run-time.

Referring back to FIG. 2 using the example of registration of block parameter attribute rules, blocks 130 and 132 register parameter attribute rules for each of their parameters 134A-N and 136A-N with entity validation and inference unit 122. Block 130 and block 132 can be built from the same predefined block or custom-built block. In other words, block 130 and block 132 can be two different instances of the same block type. However, the two instances do not need to have the same parameter attributes for their parameters. A user is free to modify a value of a parameter attribute rule for a parameter in block 130 without modifying the value of the same parameter attribute rule for the corresponding parameter in block 132. A user can also add or delete a parameter attribute and the associated rules of a parameter for block 132 without affecting any parameter attributes of the corresponding parameter for block 130. Furthermore, a user can also add or delete a parameter from an instance of a block type without affecting other instances of the same block type. One of ordinary skill in the art will appreciate that a mechanism, such as a check box, can be provided in the parameter attribute window 222 so that when the check box is checked, all instances of a block type can be enforced to have all the same parameters with the same parameter attribute rules. Therefore, a user can choose if instances of a block type need to have the same parameter and/or same attribute rules.

Once blocks 130 and 132 have registered parameter attribute rules for each of their parameters 134A-N and 136A-N with entity validation and inference unit 122, query mechanism 126 can be used to query entity validation and inference unit 122 what types of values are valid for a specific parameter. In response to the query, entity validation and inference unit 122 can return a message showing the associated registered parameter attributes and corresponding attribute rules of the specific parameter. One advantage of the present invention is that before assigning a value to a specific parameter, a user can use the query mechanism 126 to find out what types of values will be accepted by the specific parameter. Additionally, the entity validation and inference unit 122 can rely on entity validation and inference code generator 128 to generate code to test if a specific input value is valid or not.

Entity validation and inference code generator 128 can check if inputs to parameters 134A-N and 136A-N satisfy requirements set out by the values assigned to corresponding registered parameter attribute rules. The registered parameter attribute rules are used to ensure that inputs are valid before they are used in the calculation or simulation by application 120. Entity validation and inference code generator 128 can generate validation code for each block and store the generated validation code separately in the corresponding block or collectively at a central location, such as entity validation and inference unit 122, application 120, or storage 108. Alternatively, entity validation and inference code generator 128 can generate one validation code that is used to validate parameters of all blocks within a model or a project.

In one aspect of the present invention, a user can use a user-defined parameter in the model and provides a custom validation code for validating values for the user-defined parameter. The entity validation and inference code generator 128 can integrate the custom validation code into the generated validation code for a specific block or entity in the model so that each block or entity only has one validation code to validate all parameters associated with the block or entity.

In one embodiment of the present invention, entity validation and inference code generator 128 can use a pre-defined validation code template for each entity in the block diagram model. The pre-defined validation code template includes validation code fragments for each type of possible entity attributes and possible registered values. Once entities registered their attribute rules with entity validation and inference unit 122, entity validation and inference code generator 128 can plug in the registered values in the pre-defined validation code template and generate a validation code for a specific entity. The entity validation and inference code generator 128 can further optimize the generated validation code by not including any excessive code related to other types of possible entity attributes and/or possible registered values that are not used in the specific entity. One of ordinary skill in the art will appreciate that many different optimization techniques can make the generated code more efficient. One of ordinary skill in the art will appreciate that there are many ways to generate validation code and many locations to store the generated validation code and the present invention is not limited to the examples discussed herein. One of ordinary skill in the art will also appreciate a pre-defined validation code can be used to perform validation of entity attribute values and validation code does not need to be generated.

Figure 5:
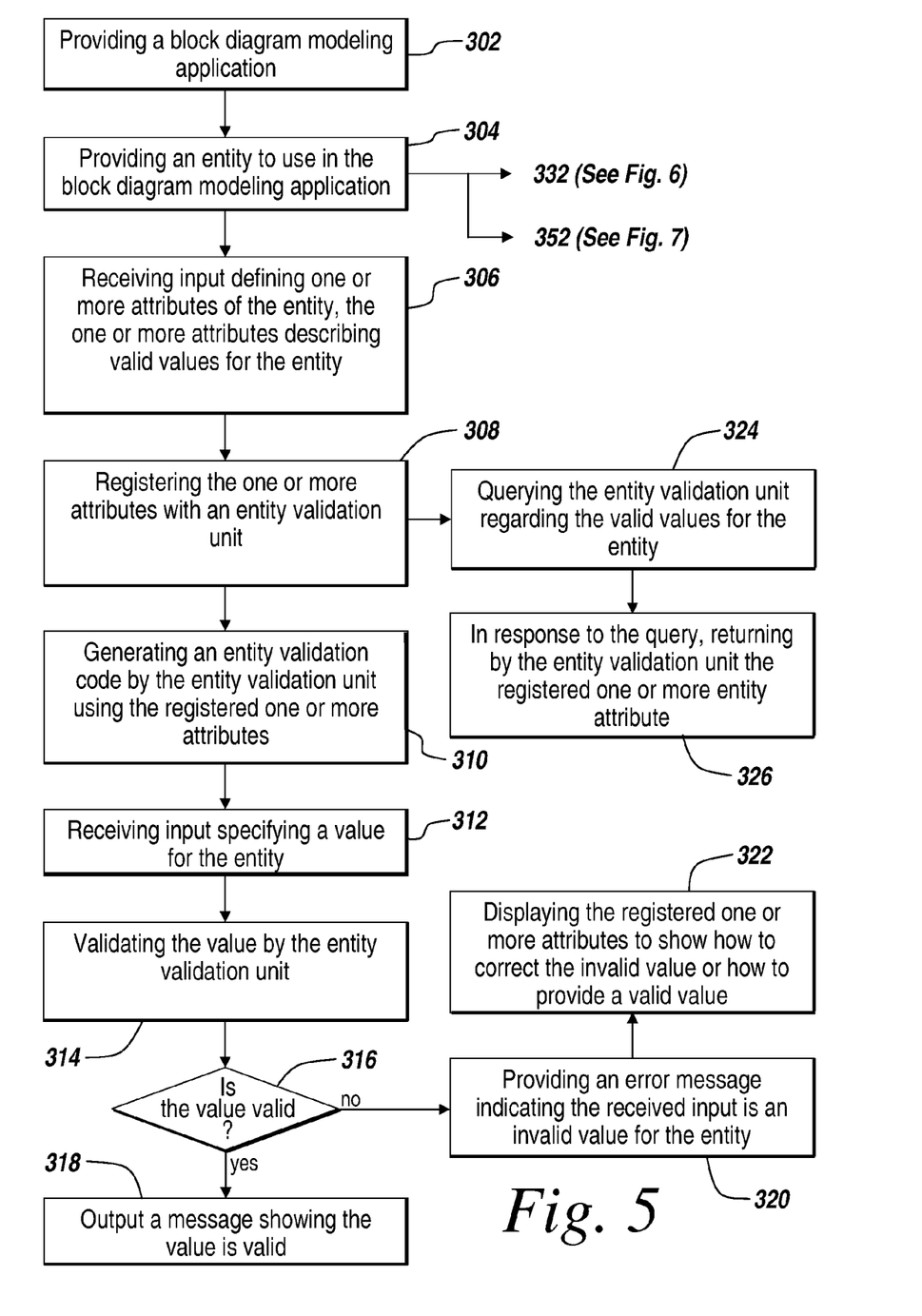
FIG. 5 is a flowchart showing steps taken to practice one embodiment of the present invention.

FIG. 5 shows a flowchart that illustrates steps taken to register entity attribute rules in accordance with one embodiment of the present invention. In step 302, a block diagram modeling application is provided. An entity is also provided for use within the block diagram modeling application in step 304. Input is received in step 306 defining one or more attribute rules of the entity. One or more attribute rules can be used to describe one or more valid values that can be accepted by the entity. The one or more attribute rules are registered in step 308 with an entity validation and inference unit 122. In step 310, the entity validation and inference unit 122 optionally generates an entity validation code using the registered one or more attribute rules. An input can be received for a value for the entity in step 312. The input value can be validated by the entity validation and inference unit 122 in step 314. The entity validation and inference unit 122 can optionally use the generated entity validation code to validate the input value. If the value is valid in step 316, a message can be displayed showing that the value is valid in step 318 or alternatively a message can be displayed showing that no input error has been found. If the value is not valid in step 316, a message can be provided to indicate the received input is an invalid value for the entity in step 320. Additionally, a message can be displayed in step 322 using the one or more registered attribute rules to show that how one can correct the invalid value or how one can provide a valid value for the entity. After the one or more attribute rules are registered with the entity validation and inference unit 122, one can query the entity validation and inference unit 122 what are valid values for the entity in step 324. In response to the query, the entity validation and inference unit 122 can return the registered one or more parameter attribute rules in step 326 to show that what requirements a valid value must fulfill.

In a further aspect of the present invention, entity validation and inference unit 122 can include a knowledge-based rule system 138 that applies user-specified rules for inference, validation, or other purposes. A knowledge-based rule system represents knowledge in terms of a set of rules that tell entity validation and inference unit 122 what it should do or what it could conclude in different situations. A knowledge-based rule system consists of multiple IF-THEN rules, multiple facts, and an interpreter controlling the application of the rules, given the facts. An example of a knowledge-based rule system is a rule-based system, sometimes also being referred as a production system.

One example of inference is attribute propagation. Attribute propagation can include, but not limited to, dimension propagation, data type propagation, fixed point data type propagation, frame propagation, complexity propagation, sample time propagation. A user can register with entity validation and inference unit 122 inference rules that should be applied within a block. The knowledge-based rule system can store multiple inference rules that are applied by entity validation and inference unit 122. The inference rules can be used to propagate compilation information through blocks. The following example functions show how a user can register an inference rule related to dimension propagation for a block:

ConditionId set_condition(PortType type, int port_number, DimsInfo dimsInfo) {
    //set the condition the facts must satisfy
}

ActionId set_action(PortType type, int port_number, DimsInfo dimsInfo) {
    //set the action performed
}

RuleId set_rule(ConditionId cid, ActionId aid) {
    //set the rule
}

Using the above exemplary functions, a user can specify a condition that an input port 0 is scalar by calling
    cid=set_condition(Input, 0, ScalarDims);

The user can specify an action that output port 1 is set to be a matrix dimension by calling aid=set_action(OutputPort, 1, MatrixDims);

In the end, the user can specify a rule by calling rid=set_rule(cid, aid);

Hence, the specified rule will set output port 1's dimension to a matrix when the input port 0 is a scalar.

With the registered rules, entity validation and inference unit 122 compares the current condition of the entity with the conditions specified in the rules. If a rule's condition is matched, then the corresponding action is executed. Entity validation and inference unit 122 performs this comparison for every registered rule.

The knowledge-based rule system 138 can also apply the registered rules in the intermediate representation (IR) or during code generation of a block diagram model. The knowledge-base rule system 138 can be used to specify how attributes, relationships, and behaviors of an entity in an IR for simulation or code generation should be. This includes attribute propagations. In IR, there can be multiple nodes. Each node, like a block, has inputs and outputs. The type (data type and other properties) of outputs is related to the type of the inputs. The present invention can use the knowledge-based rule system 138 to specify rules for the relationship between the inputs and outputs in the IR the same way as for blocks. One of ordinary skill in the art will appreciate that there are many different IRs that can be used with the present invention. An IR is usually a representation of a model or simulation of a model in the code generation process. There can be many different IRs used in the code generation process. For example, in Simulink®, one or more IRs of a model can be generated during the Code Generation Intermediate Representation (CGIR).

Each rule may include a condition section and an action section. Table 1 shows a few examples of inference rules related to I/O signals.

TABLE 1

| Condition | Action |
| --- | --- |
| Any input port is floating-point data type | Set output port 1 to be double |
| No input port is floating-point data type | Set output port 2 to be uint32 |
| Both the input port 1 and the parameter A are fixed-point data types. | Set output port 3 to be the fixed-point data type that can represent the product of input port 1 and parameter x with minimal rounding errors |
| Either parameter B or parameter C is real scalar or vector | Set output port 4 to be real scalar |
| Any input port is 2-D matrix | Throw error E with message "2D matrix cannot be an input at any input port". |

Table 2 shows a few examples of inference rules related to entities in general.

TABLE 2

| Condition | Action |
| --- | --- |
| Parameter A is double | Parameter B has to be Boolean |
| Signal A has a minimal value | Signal B has a maximal value |
| Parameter A is vector | Value of A is monotonic |
| Signal B is matrix | parameter A has to be matrix |
| Entity A have property C | Entity B have to have property D |

The action will only be taken when the corresponding condition is satisfied. Each block can register with entity validation and inference unit 122 how propagations should be done within the block. Entity validation and inference unit 122 can validate the registered rules for conflict. A warning message or an error message can be displayed to show the conflicting registered rules. Priority numbers can be optionally assigned to each of the registered rules. When there is a conflict between two or more registered rules, the registered rule with the highest priority is enforced. A warning message or an error message can be displayed to show which registered rules have conflicts and which registered rule is enforced. A graphical user interface or API can be provided by the entity validation and inference unit 122 to register the propagation rules.

Figure 6:
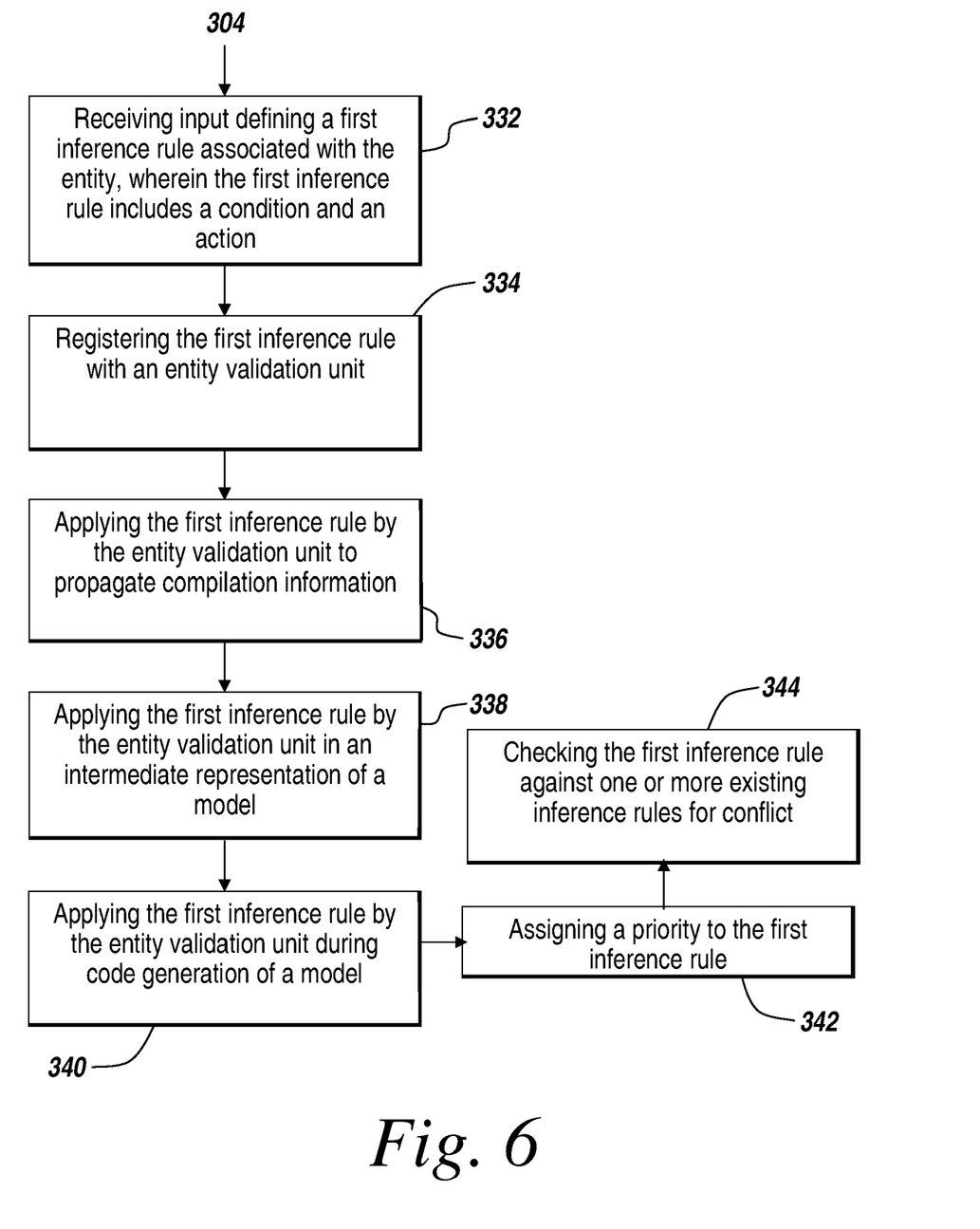
FIG. 6 is a flowchart showing steps taken to practice another embodiment of the present invention.

FIG. 6 illustrates a flowchart depicting steps taken to practice one embodiment of the present invention. After an entity is provided to use in the block diagram modeling application in step 304, user input defining a first inference rule of the entity is received in step 332. The inference rule includes a condition and an action. The action is only performed when the condition is satisfied. In step 334, the first inference rule is registered with an entity validation and inference unit 122. The registered first inference rule can be applied by the entity validation and inference unit 122 to validate and/or propagate compilation information in step 336. The registered first inference rule can also be applied by the entity validation and inference unit 122 in an intermediate representation of a model in step 338. The registered first inference rule can additionally be applied during code generation of a model in step 340. The first inference rule can be optionally assigned a priority in step 342. After the first inference rule is registered with entity validation and inference unit 122, the entity validation and inference unit 122 can check if the first inference rule conflicts with any existing inference rules. Alternatively, the entity validation and inference unit 122 can perform the checking prior to the registration of the first inference rule 122.

In another aspect of the present invention, the knowledge-based rule system can be used to specify how a dynamic dialog should behave. A dynamic dialog is a dialog that displays options depending on the received input. For example, an item can be disabled (grayed out) or enabled, invisible or visible, based on the user's input. Hence the appearance of the dialog can change with the user input. These changes can be specified by the rules for the attributes of the dialog and dialog elements, for the relationships between elements in the dialog and for the behaviors of the entities related to the elements. When a condition of a rule is satisfied, the dynamic dialog performs the action specifies by the rule. The action section of the rule set out the manner that an entity or attribute should be displayed in the dynamic dialog box when a condition is satisfied. For example:

Rule 1: if Boolean parameter A is checked, then entity B should become visible.

Rule 2: if Boolean parameter C is checked, then entity D should be set to −1 and disabled.

Rule 3: if enum parameter E is set to value F, then entity G should be disabled and invisible.

A graphical user interface can be employed to allow a user to specify rules for the dynamic dialog. On the other hand, functions can be used to specify rules for the dynamic dialog. The following example functions show how functions can be used to specify rules for a dynamic dialog:

ConditionID set_condition(const char* parameter_name, Status s) {
    //Set parameter_name and its status (visible/invisible, disabled/enabled)
}

```
ActionID set_action(const char* parmater_name, Status s) {
    //Set parameter_name and its desired status (visible/invisible, disabled/enabled)
}
RuleID set_rule(ConditionID cid, ActionID aid) {
    //set_rule's condition and action
}
```

Figure 7:
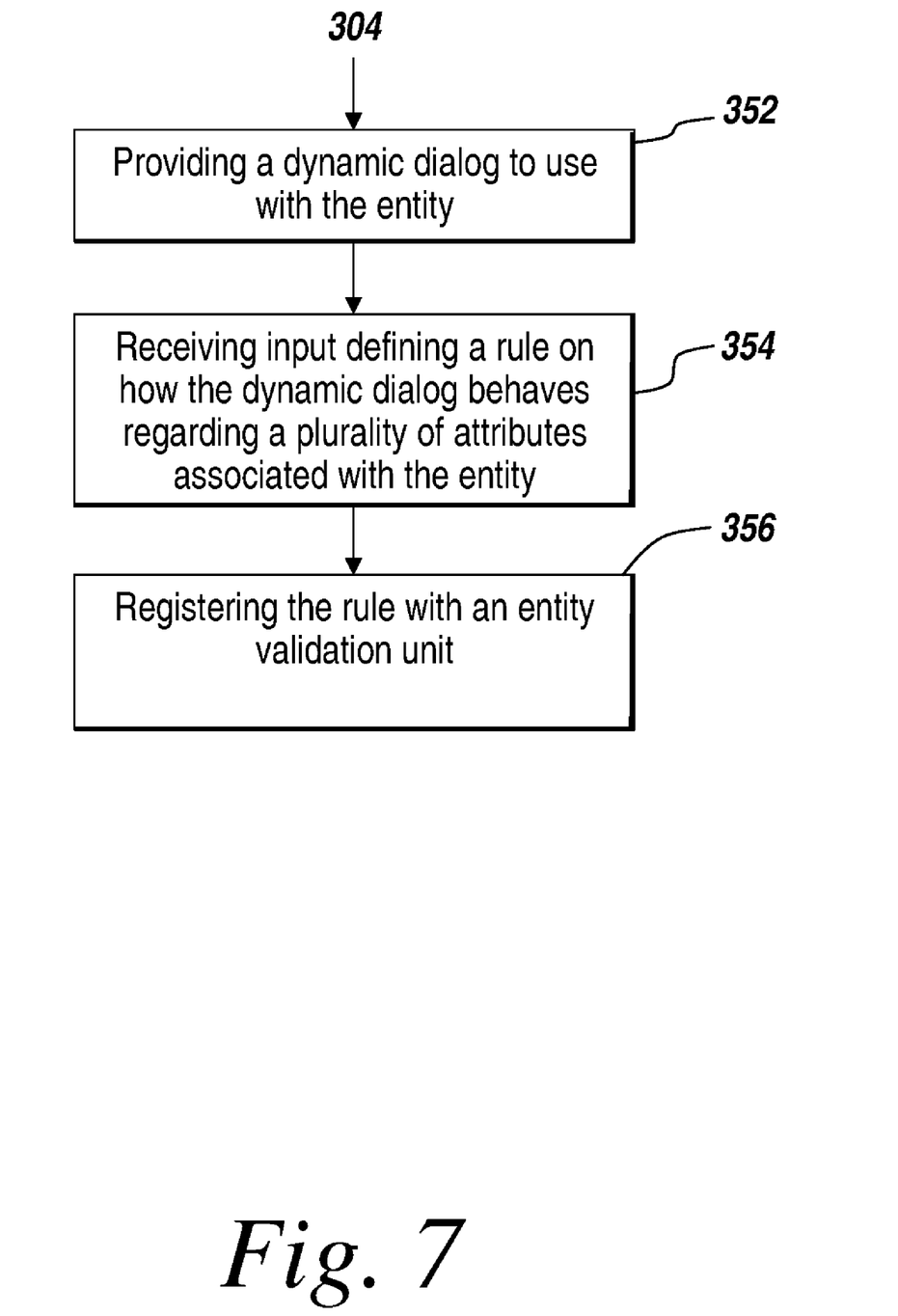
FIG. 7 is a flowchart showing steps taken to practice a further embodiment of the present invention.

FIG. 7 illustrates a flowchart depicting steps to practice one embodiment of the present invention. After an entity is provided to use in the block diagram modeling application in step 304, a dynamic dialog is provided in step 352 to use with the entity. In step 354, user input is received defining a rule on how the dynamic dialog behaves regarding entities associated with the entity. The rule is then registered with an entity validation and inference unit 122 that is separated from the entity in step 356.

In a further aspect of the present invention, the knowledge-based rule system 138 can be used to register rules for attributes, relationship, and behavior of entities associated with a fixed-point aspect. Fixed point data type propagation is one special case of data type propagation. The following rules present examples of inference rules regarding fixed point data type propagation.

Rule 1: If input port 0 is fixed point data type A, then output port 0 is fixed point data type B.

Rule 2: If input port 0 is fixed point data type C, then output port 0 is the fixed point data type that can represent the input with minimal rounding error and has the size of the integer of the target.

Rule 3: If input port 0 is fixed point data type, then input port 2 should be fixed point data type and it has smaller container size than that of input port 0 data type.

In another aspect of the present invention, the knowledge-based rule system 138 can be used to register rules for attributes, relationships, and behaviors of entities within a graphical model. Hence, parameter validation can be done using a knowledge-based rule system. The following inference rules provide examples of applications in parameter validation.

Rule 1: If parameter A is double, then parameter B has to be Boolean.

Rule 2: Data type of parameter A is the same as the data type of B.

Rule 3: Allowing minimal value of signal A is the same as allowing maximal value of signal B.

Rule 4: If parameter A is a vector, then its value has to be monotonic.

Rule 5: If signal B is a matrix, then parameter A has to be a matrix.

Rule 6: If entity A has property C, then entity B has to have property D.

In yet another aspect of the present invention, the knowledge-based rule system 138 can be used to register rules for propagation of attributes, relationships, or behaviors of entities in a graphical model. User interface (UI) functions can be provided for users to specify rules for propagation. For the case of dimension propagation within a block, the UI function signatures can look like the following:

ConditionId set_condition(PortType type, int port_number, DimsInfo dimsInfo);

ActionId set_action(PortType type, int port_number, DimsInfo dimsInfo);

RuleId set_rule(ConditionId cid, ActionId aid);

With the function set_condition, a user can specify a condition that an input port 0 is scalar by calling cid=set_condition (InputPort, 0, ScalarDims). With the function set_action, a user can specify an action that output port 1 is set to be a matrix by calling aid=set_action (OutputPort, 1, MatrixDims). Lastly, a user can specify a rule by calling rid=set_rule (cid, aid). The rule provides that if input port 0 is scalar, then the output port 1 is set to matrix.

In still another aspect of the present invention, the knowledge-based rule system 138 can be used to specify rules for attributes, relationships, or behaviors of entities associated with code generation. For example, Rule 1: If a division in the generated code has denominator to be unsigned integer, then eliminate the generated code for divide-by-zero protection.

Rule 2: If a variable in the generated code has the name starting with "doNotOptimize", then do not optimize these variables when generating code.

Rule 3: If saturation only happens at edge cases in the generated code, then eliminate the generated saturation code. (For example, with signed char A=(signed char) B/−1, the saturation only happens when B is the value of −128. This is an edge case.)

Rule 4: If the size of a generated utility function is less than 16 bytes or the number of operations in the generated utility function is less than 5, then inline this utility function.

With the specified rules, knowledge-based rule system 138 can compare the current condition of the block with the conditions in the registered rules in the rule base. If one rule condition is satisfied, then the action of this rule is executed. This process repeats until no conditions of the rules are satisfied.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A tangible computer-readable storage medium storing computer-executable instructions for execution by a processor, the medium storing one or more instructions for:
   registering, with a modeling application, one or more rules related to an entity associated with a model;
   receiving input specifying a value of a first attribute associated with the entity; and
   applying the one or more registered rules to the value of the first attribute to:
   infer a value of a second attribute associated with the entity or another entity associated with the model, or
   validate the value of the first attribute or the value of the second attribute.

2. The medium of claim 1, wherein the entity is a parameter associated with a block of the model.

3. The medium of claim 1, wherein the entity is a parameter associated with a signal of the model.

4. The medium of claim 1, wherein the modeling application includes a unit that applies the one or more registered rules to the value of the first attribute.

5. A method comprising:
   registering one or more rules related to an entity associated with a model;
   receiving input specifying a value of a first attribute associated with the entity; and applying the one or more registered rules to the value of the first attribute to:
- infer a value of a second attribute associated with the entity or another entity associated with the model, or
- validate the value of the first attribute or the value of the second attribute.

6. The method of claim 5, wherein the rules are registered with a modeling application that includes a unit that applies the one or more registered rules to the value of the first attribute.

7. A tangible computer-readable storage medium storing computer-executable instructions for execution by a processor, the medium storing one or more instructions for:
- registering, with a modeling application, one or more rules related to one or more attributes associated with a block of a model;
- identifying a value of a first attribute associated with the block; and
- inferring a value of a second attribute associated with the block based on the value of the first attribute and the one or more registered rules.

8. The medium of claim 7, wherein the first attribute is associated with a first port of the block and the second attribute is associated with a second port of the block.

9. The medium of claim 7, wherein the modeling application includes a unit that infers the value of the second attribute.

10. A tangible computer-readable storage medium storing computer-executable instructions for execution by a processor, the medium storing one or more instructions for:
- defining one or more rules for validating or inferring a value of an attribute associated with an entity of a model, or registering one or more rules with a unit that validates or infers the value; and
- validating or inferring the value based on the one or more defined or registered rules.

11. The medium of claim 10, wherein at least one of the defined or registered rules includes a constraint on the value.

12. The medium of claim 10, further comprising:
- inferring at least one of an attribute of the entity, a behavior of the entity, or a relation of the entity, based on the one or more defined or registered rules.

13. The medium of claim 10, wherein the entity further comprises an aspect of the model that that is associated with the value.

14. The medium of claim 13, wherein the aspect of the model includes at least one of the model, a block, a model reference block, a signal, a bus, a bus signal, a struct signal, a parameter, a block parameter, a model option, a subsystem option, a block option, a block display option, a signal display option, an optimization setting, a graphical dialog, a dynamic dialog, or a relative tolerance of a numerical solver.

15. The medium of claim 10, wherein the one or more defined or registered rules are defined based on at least one of a condition and an action, prepositional logic, first-order logic, an event, a temporal constraint, a probability, or fuzzy logic.

16. The medium of claim 10, further comprising:
- providing at least one or more default rules that include a default constraint on the value.

17. The medium of claim 10, further comprising one or more instructions for:
- generating validation code based on the one or more defined or registered rules, the validation code including code for inferring or validating the value.

18. The medium of claim 17, further comprising one or more instructions for:
- executing the validation code to validate or infer the value.

19. The medium of claim 17, wherein in addition to being generated based on the one or more defined or registered rules, the validation code is generated from a predefined validation code template.

20. The medium of claim 10, further comprising one or more instructions for: identifying a conflict in the one or more defined or registered rules.

21. A method comprising:
- defining one or more rules for validating or inferring a value of an attribute associated with an entity of a model, or registering one or more rules with a unit that validates or infers the value; and
- validating, using a processor, or inferring, using the processor, the value based on the one or more defined or registered rules.

22. The method of claim 21, further comprising:
- inferring at least one of an attribute of the entity, a behavior of the entity, or a relation of the entity, based on the one or more defined or registered rules.

23. The method of claim 21, further comprising:
- generating validation code based on the one or more defined or registered rules, the validation code including code for inferring or validating the value.

24. The method of claim 23, further comprising:
- executing the validation code to validate or infer the value.

25. The method of claim 21, wherein at least one of the defined or registered rules includes a constraint on the value.

26. A system comprising:
a processor for:
- registering one or more rules related to an entity associated with a model;
- receiving input specifying a value of a first attribute associated with the entity; and
- applying the one or more registered rules to the value of the first attribute to at least one of:
  - infer a value of a second attribute associated with the entity or another entity associated with the model, or
  - validate the value of the first attribute or the value of the second attribute.

27. The system of claim 26, wherein the one or more rules are registered with a unit that: infers the value of the second attribute, or
- validates the value of the first attribute or the value of the second attribute.

28. The system of claim 26, wherein the one or more registered rules include one or more default rules that include a default constraint on the value of the first attribute or the value of the second attribute.

29. The system of claim 26, wherein the processor further generates validation code based on the one or more registered rules.

30. The system of claim 29, wherein the validation code when executed performs at least one of:
- infers the value of the second attribute, or
- validates the value of the first attribute or the value of the second attribute.

31. The system of claim 26, wherein the processor further resolves a conflict in the one or more registered rules.

32. A method comprising:
- registering one or more rules associated with an entity of a model, the one or more rules related to one or more attributes of the entity;
- receiving input specifying a value for an attribute of the entity;
- applying the one or more rules to the value to determine if the value is valid; and generating, using a processor, a validation result that indicates whether the value is valid based on the applying.

33. The method of claim 32, further comprising:
storing the validation result in a storage.

34. The method of claim 32, wherein the entity is a dialog element, a parameter associated with the model, or a signal associated with the model.

35. The method of claim 32, further comprising:
inferring a value of an attribute of a second entity associated with the model based on the one or more rules.

36. The method of claim 32, further comprising:
displaying a message based on the validation result.

37. The method of claim 32, further comprising:
displaying one or more suggestions for correcting the value.

38. The method of claim 32, wherein the one or more rules are applied during code generation for the model.

39. The method of claim 32, wherein the one or more rules are applied while the model is being executed.

40. The method of claim 32, wherein the one or more rules are registered with a unit that applies the one or more rules to the value to determine if the value is valid.

* * * * *